Dec. 8, 1925.                                       1,564,769
O. EPPENSTEIN
DISTANCE MEASURING DEVICE
Filed May 22, 1924              6 Sheets-Sheet 1
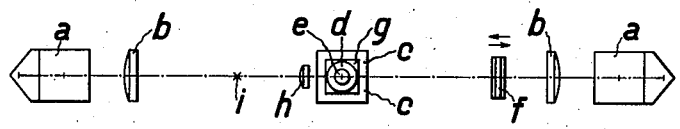
Fig. 2
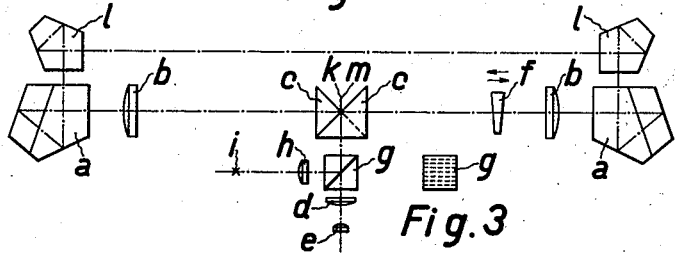
Fig. 3
Fig. 1
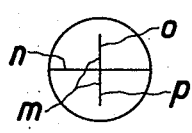
Fig. 4
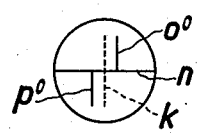
Fig. 5
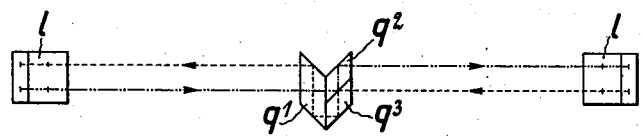
Fig. 7
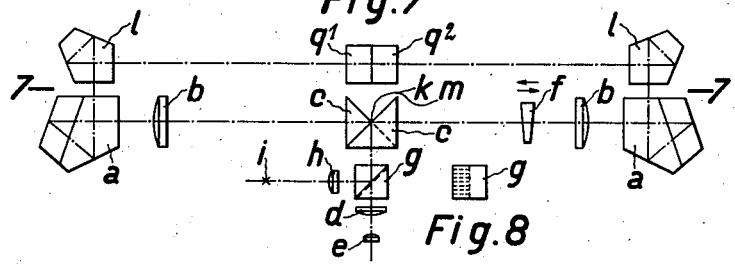
Fig. 8
Fig. 6
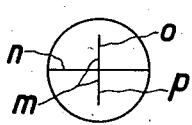
Fig. 9
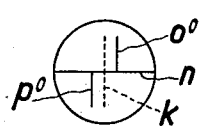
Fig. 10
Inventor:
Otto Eppenstein Dec. 8, 1925.
O. EPPENSTEIN
1,564,769
DISTANCE MEASURING DEVICE
Filed May 22, 1924    6 Sheets-Sheet 2
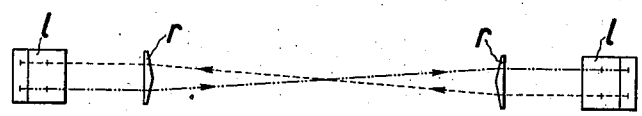
Fig. 12
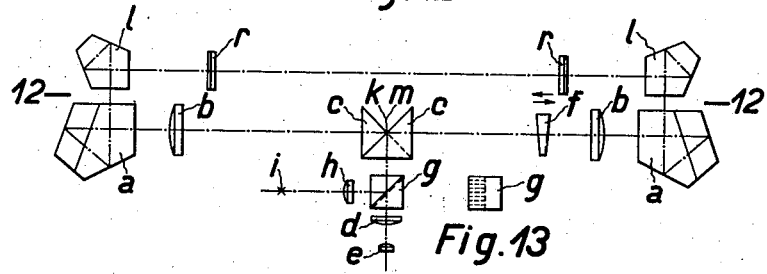
Fig. 13
Fig. 11
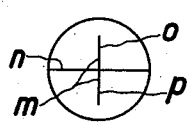
Fig. 14
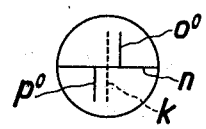
Fig. 15
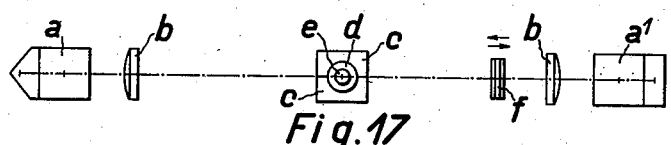
Fig. 17
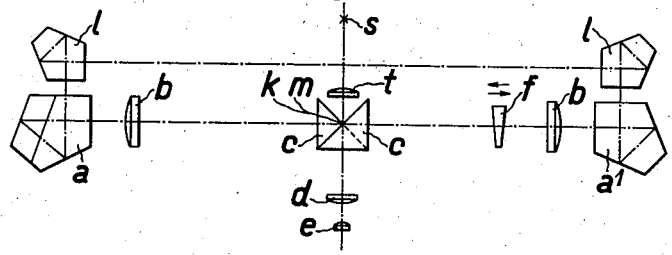
Fig. 16
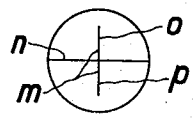
Fig. 18
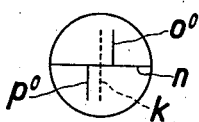
Fig. 19
Inventor:
Otto Eppenstein Dec. 8, 1925.  1,564,769
O. EPPENSTEIN
DISTANCE MEASURING DEVICE
Filed May 22, 1924   6 Sheets-Sheet 3

Inventor:
Otto Eppenstein

Dec. 8, 1925. 1,564,769
O. EPPENSTEIN
DISTANCE MEASURING DEVICE
Filed May 22, 1924  6 Sheets-Sheet 4

Inventor:
Otto Eppenstein

Dec. 8, 1925.  1,564,769
O. EPPENSTEIN
DISTANCE MEASURING DEVICE
Filed May 22, 1924   6 Sheets-Sheet 5

Inventor:
Otto Eppenstein

Dec. 8, 1925.  1,564,769
O. EPPENSTEIN
DISTANCE MEASURING DEVICE
Filed May 22, 1924   6 Sheets-Sheet 6

Inventor:
Otto Eppenstein

Patented Dec. 8, 1925.

1,564,769

UNITED STATES PATENT OFFICE.

OTTO EPPENSTEIN, OF JENA, GERMANY, ASSIGNOR TO FIRM OF CARL ZEISS, OF JENA, GERMANY.

DISTANCE-MEASURING DEVICE.

Application filed May 22, 1924. Serial No. 715,229.

*To all whom it may concern:*

Be it known that I, OTTO EPPENSTEIN, a citizen of Germany, and residing at Jena, Germany, have invented a new and useful Distance-Measuring Device (for which I have filed an application in Germany, May 31, 1923), of which the following is a specification.

The present invention deals with the task of testing uniocular telemeters having the base-line within the instrument in a simple manner without the aid of a special correcting lathe with respect to their state of correction and of correcting the same, if necessary. By the patent specification 939,366 it has become known to solve this task by disposing a correcting mark in the ocular image-plane and by transmitting the rays, which emanate from this mark and traverse the one half of the telemeter in the reversed path of rays, by means of correcting reflector systems disposed in front to the other half in order to eventually reunite these rays in the ocular image-plane to an image of the correcting mark. In the examples of the said patent specification the correcting reflector systems are disposed behind the entrance reflector systems; of course, it does not change the nature of the subject if the reflector systems to be disposed in front for the purpose of correction be fixed before the entrance reflector systems of the telemeter with a view to embracing the whole system by means of the correcting method. With such arrangements one imparts to the correcting reflector systems an invariable angle of deflection of such a size that with a correct adjustment of all parts of the telemeter to a definite distance the image of the mark coincides with the mark itself. As a rule, one chooses as a whole angle of deflection of the correcting reflector systems 180°, so that the proper overlapping position of the mark and the image must be existent if the telemeter be adjusted to an infinitely distant object.

This correcting arrangement has the drawback that the correcting mark in the ocular image-plane is visible in the field of view which is under certain conditions objectionable. According to the present invention it is possible to avoid these drawbacks and at the same time attain double the accuracy for the correction by using as a correcting mark the real image of a mark disposed outside the ocular image-plane and imaged in the reversed path of rays into the ocular image-plane. Thereby both the mark and its real image are invisible to an observer looking into the ocular and the entire field of view remains free for the measurement if the correcting reflector system be only disposed in front during the correcting process. Of course, the arrangement should then be made in such a way that the real image of the mark now replacing the correcting mark intersects the boundary line in the field of view in order that the rays producing the image in both parts of the field of view on their path over the two halves of the telemeter are also reunited in the ocular image-plane to two partial images of the mark which may be brought into coincidence with each other. The said double accuracy is brought about by the fact that the rays, produced by the two partial images of the mark, traverse in opposite direction the same optical members and that consequently the relative displacement of the image, on the state of correction of the telemeter having been impaired, is twice as large as the displacement between a physical correcting mark and its image.

The imaging of the mark in the ocular image-plane may be realized in a different way. It is, e. g. possible to dispose between the ocular and the image plane or on the outside of the ocular a semi-transparent reflector which reflects the rays, emerging from a laterally disposed correcting mark, into the axial direction. For the imaging proper a suitable imaging system is requisite. If the reflector be disposed on the outside of the ocular, the latter forms itself the imaging system or part thereof. The semi-transparent reflector may also be replaced by a reflector which only covers a part of the cross section of the rays and which may be silvered semi-transparent or opaque. A drawback arising with all such arrangements consists in the great loss of light which is connected with the insertion of a semi-transparent reflector or with the reduction of the cross section of the rays and by which the luminosity of the image presented to the eye is reduced at best to about one half. A particularly suitable arrangement exempt from this drawback is attained by imaging the mark into the ocular image-plane on the path of the so-called lost rays, i. e. those rays which are prevented from entering the ocular by the separating prism system. As these rays are besides not used for the measurement, the whole cross section traversed by these rays may be used for imaging the correcting mark. In this manner one attains for the correction the same luminosity as for the measurement without impairing in any way the passage of the rays through the cross section serving for the measurement.

When using the invention care should be taken that the correcting rays, after having traversed the two halves of the telemeter, will actually be able to get through the separating prism system into the eye of the observer in order to render visible the arising partial images of the mark. If with a telemeter construction this possibility does not readily exist because the two correcting ray pencils would strike such a part each of the separating prism system which prevents them from entering the eye of the observer, the free passage may be attained by transmitting at any one time the correcting ray pencils by means of deflection from their direction or by the introduction of an additional inversion of the image within the area of the paths of rays not required for distance measuring to the other part of the separating prism system which admits of the free passage of the rays through the eye and thus renders visible the partial images of the mark. If, however, the correcting ray pencils are entirely or partly prevented from entering the eye by an opaque reflector which is inserted into the path of rays and which, whilst concealing a part of the cross section of the rays serves for imaging the mark into the ocular image-plane, and if therefore the image of the correcting mark would be visible only partly or not at all, it is possible to render the partial images of the mark visible in a simple way by the introduction of an additional parallel displacement.

With a view to attaining visible partial images of the invisible correcting mark it is unnecessary that both halves of the telemeter are traversed by the correcting ray pencils which are coordinate to the two partial images of the mark. It is also possible to cause each of the two pencils to traverse twice to advantage only one each of the two halves in opposite direction. By inserting, for instance, within the area of the path of rays a plane surface reflecting on both sides and perpendicular to the optical axis of the correcting system, the direction of the rays of each of the two partial pencils is inverted and each of them traverses the path already covered in opposite direction, whereby the reflecting surface causes the said additional inversion of the image. Also in this case the relative displacement of the image, on the state of correction of the telemeter having been impaired, becomes just as large as if both halves of the telemeter be traversed by each correcting ray pencil. Thereby it is immaterial whether in both halves simultaneously or only in one of them the state of correction is impaired because owing to the twofold traversing of the same optical members each of the two correcting ray pencils brings about by itself the reduplication of an existent displacement of the image.

In the annexed drawing Figs. 1 to 5 show an example of the invention; Fig. 1 is a plan elevation, Fig. 2 a front elevation, Fig. 3 shows a detail, Fig. 4 shows the ocular image-field with the corrected telemeter, Fig. 5 the ocular image-field with the uncorrected telemeter.

Figs. 6 to 10 show a second example; Fig. 6 is a plan elevation, Fig. 7 a section on the line 7—7 of Fig. 6, Fig. 8 shows a detail, Figs. 9 and 10 show the image-field with the corrected and uncorrected telemeter respectively.

Figs. 11 to 15 show a third example; Fig. 11 is a plan elevation, Fig. 12 is a section on the line 12—12 of Fig. 11, Fig. 13 shows a detail, Figs. 14 and 15 show the image-field with the corrected and uncorrected telemeter respectively.

Figs. 16 to 19 show a fourth example; Fig. 16 is a plan elevation, Fig. 17 is a front elevation, Figs. 18 and 19 show the image field with the corrected and uncorrected telemeter respectively.

Fig. 20 is a plan elevation, Fig. 21 is a front elevation, Figs. 22 and 23 show the image-field with the corrected and uncorrected telemeter respectively.

Fig. 24 is a plan elevation, Fig. 25 is a front elevation, Figs. 26 and 27 show the image-field with the corrected and uncorrected telemeter respectively.

Figure 21:
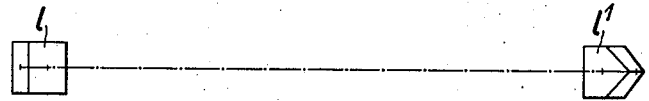
Figs. 20 to 23 show a fifth example.
Figure 20:
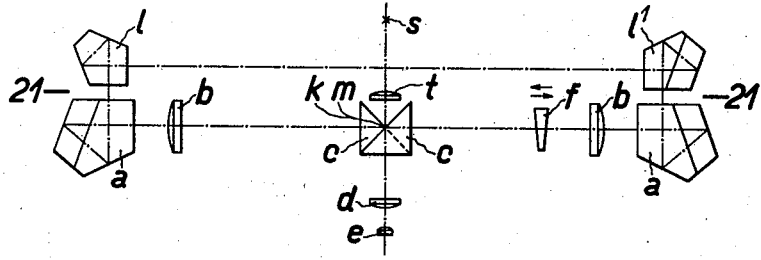
Figure 22:
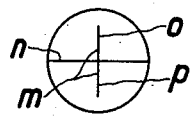
Figure 23:
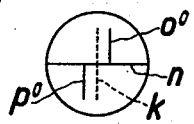
Figure 25:
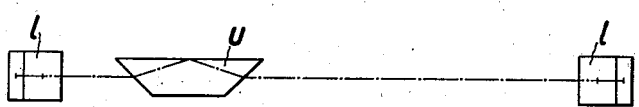
Figs. 24 to 27 show a sixth example.
Figure 24:
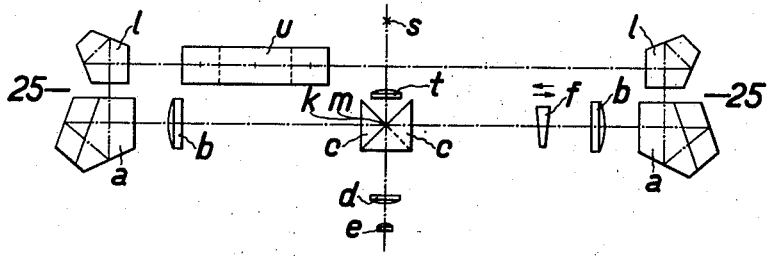
Figure 26:
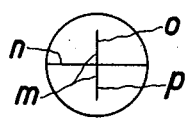
Figure 27:
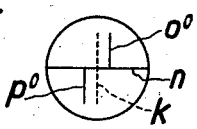
Figure 29:
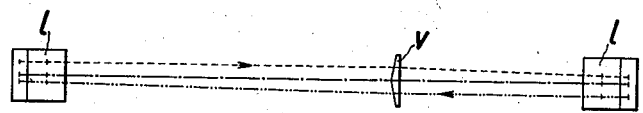
Figure 28:
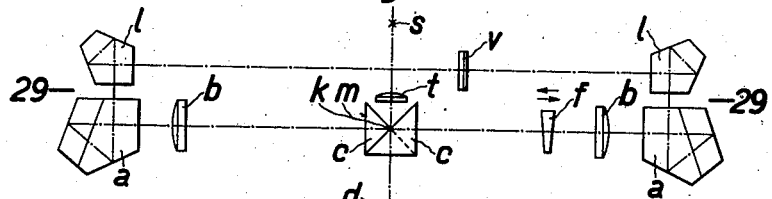
Figure 30:
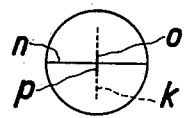
Figure 31:
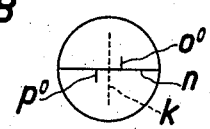

Figs. 28 and 31 show a seventh example; Fig. 28 is a plan elevation, Fig. 29 is a section on the line 29—29 of Fig. 28, Figs. 30 and 31 show the image field with the corrected and uncorrected telemeter respectively.

Figure 33:
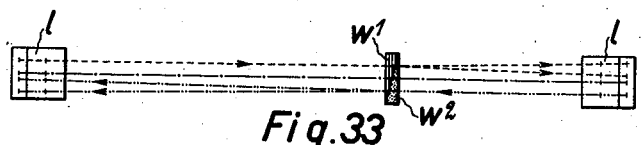
Figure 32:
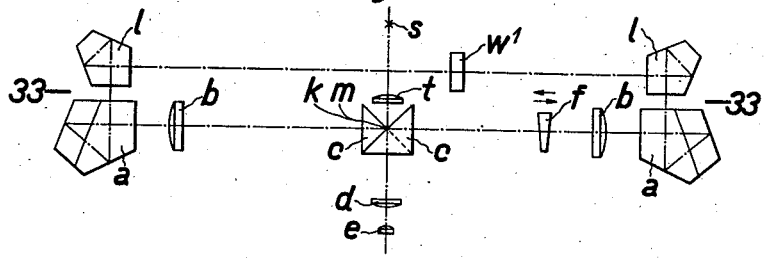
Figure 34:
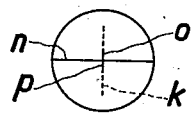
Figure 35:
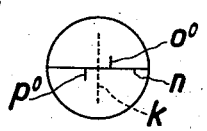

Figs. 32 to 35 show an eighth example; Fig. 32 is a plain elevation, Fig. 33 is a section on the line 33—33 of Fig. 32, Figs. 34 and 35 show the image-field with the corrected and uncorrected telemeter respectively.

Figure 37:
Figure 36:
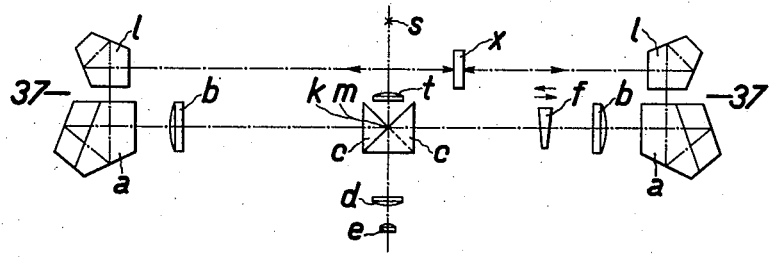
Figure 38:
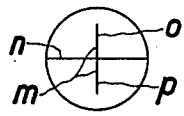
Figure 39:
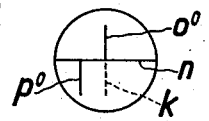

Figs. 36 to 39 show a ninth example; Fig. 36 is a plan elevation, Fig. 37 is a section on the line 37—37 of Fig. 36, Figs. 38 and 39 show the image-field with the corrected and uncorrected telemeter respectively.

Figure 43:
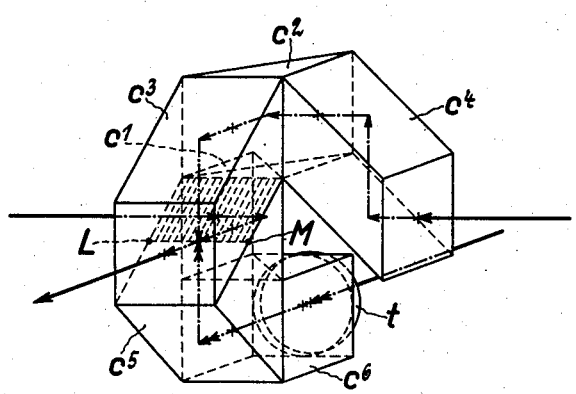
Figure 41:
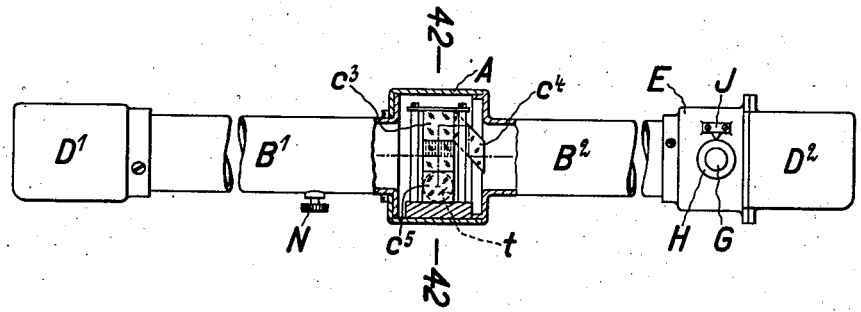
Figure 40:
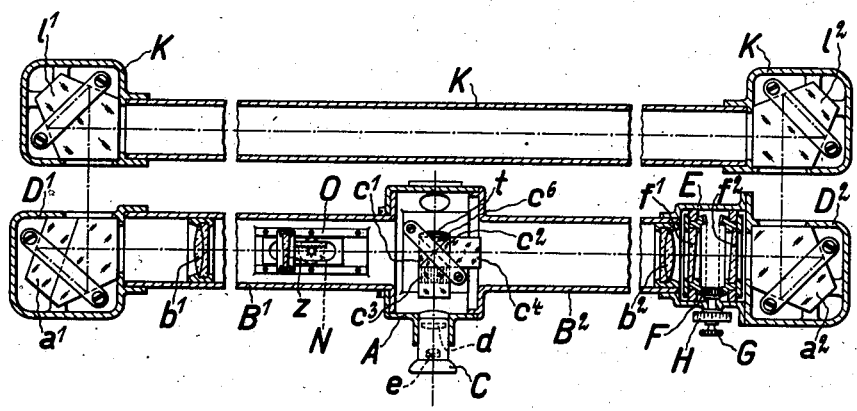
Figure 42:
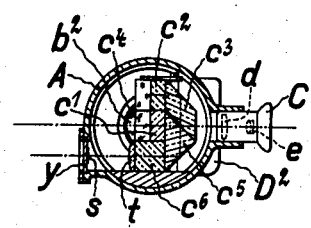

Figs. 40 to 43 show a tenth example: Fig. 40 is a plan elevation in a section, Fig. 41 is a front elevation, partly in section, Fig. 42 is a section on the line 42—42 of Fig. 41, Fig. 43 shows a detail.

The first example (Figs. 1 to 5) shows a coincidence telemeter. The objective systems are formed by two pentagonal optical square-prisms $a$, provided with an image-erecting roof each, and of two objective lenses $b$. The separating prism system consists of two cemented isosceles-rectangular prisms $c$ which deflect the luminous rays, emerging from the objectives $b$, by 90° each in such a way that they are united in the optical axis of an ocular consisting of a field lens $d$ and an eye lens $e$. The position of the ocular image-plane is such as to contain the point of intersection of the two edges of the separating prism system $c, c$. A displaceable, refractive prism $f$ represents the principal part of the measuring device. A cubiform prism $g$ inserted into the path of rays between the field lens $d$ and the separating prism system $c, c$ consists of two isosceles-rectangular prisms cemented together with their hypothenusal surfaces, the one of which is silvered semi-transparent, and produces with the aid of a lens $h$ a real image $k$ of a linear mark $i$ rigidly connected with the instrument which image intersects the boundary line in the ocular field of view and serves as a correcting mark. Fig. 3 shows a top plan view of the cubiform prism $g$ as seen from the mark $i$. Two correcting reflector systems, disposed in front of the entrance apertures of the rays of both telescope systems and consisting of two pentagonal optical square-prisms $l$, which cause together a deflection of the rays by 180°, transmit the correcting ray pencils, emerging from the correcting mark $k$ and traversing one each of the telescope systems $a, b$ in the inverted path of rays, at any one time to the other telescope system. These rays are eventually reunited in the ocular image-plane to an image $m$ of the correcting mark $k$. The image $m$ coincides, on the telemeter being adjusted to an infinitely remote object and with an undisturbed state of correction, with the image $k$ serving as a correcting mark and can be perceived by the eye of the observer through the ocular $d, e$ since the rays emanating from it are partly deflected by the semi-transparent silvered surface of the cubiform prism $g$ in the direction of the mark $i$ but partly traverse this prism unhindered. The correcting mark $k$, however, is concealed to the eye of the observer. If the state of correction be undisturbed, the eye sees in the two halves of the image-field separated by a line $n$ two partial images $o$ and $p$ of the correcting mark in coincidence in the position shown in Fig. 4. A disturbance of the state of correction of the telemeter displaces these partial images, e. g. into two positions $o^0$ and $p^0$ represented in Fig. 5 which are equidistant from the position of coincidence in opposite direction. The original state of correction of the telemeter can now be brought about again by displacing the prism $f$ by an adjustment of the measuring device until the two partial images of the mark $o^0$ and $p^0$ coincide again, i. e., until they have resumed the positions $o$ and $p$, and it will then only be necessary to set the index of the measuring scale for the position of coincidence brought about anew to the mark "infinite."

The second constructional example (Figs. 6 to 10) shows in Fig. 6 the same coincidence telemeter in a plan elevation in which, however, the diagonal surface of the cubiform prism $g$ is silvered semi-transparent up to half its height as is obvious from the top plan view of this prism in Fig. 8 as seen from the mark $i$. Owing to the reflection in the prism $g$ only acting at half the height of the cross section of the rays a part of the partial ray pencils which serve for imaging the correcting mark $k$ would not be able to get into the eye of the observer, so that the respective image points of the mark would be invisible. An additional prism system inserted into the part of the correcting paths of rays not required for distance measuring causes the additional parallel displacement of the partial ray pencils which is requisite for this reason. It consists of a prism $q^1$, having a parallelogram-shaped cross section with a pointed edge-angle of 45° and of a second uniform prism which is itself composed of two prisms $q^2$ and $q^3$ having a similar cross section and cemented with $q^1$. The boundary surface between $q^2$ and $q^3$ is reflecting on both sides. Fig. 9 shows the ocular image-field with the partial images of the mark $o$ and $p$ coinciding with an undisturbed state of correction of the telemeter; Fig. 10 with the partial images of the mark $o^0$ and $p^0$ with a disturbed state of correction. The correcting process is the same as that described in the first constructional example.

A third constructional example is shown in Figs. 11 to 15. This example entirely corresponds to the preceding one with the exception of the additional parallel displacement of the partial ray pencils being replaced through the prism system $q^1, q^2, q^3$ by an alternate parallel displacement effected with the aid of two uniform double wedges $r$.

Figs. 16 to 19 show as fourth example an inversion telemeter. In this example as well as in all the following ones the imaging of a linear mark $s$, disposed on the object side and rigidly connected to the apparatus, is brought about on the path of the lost rays. A lens $t$ produces of this mark $s$ in the ocular image-plane a real image $k$ which intersects the boundary line in the ocular image-field and serves as a correcting mark. The position of the ocular image-plane is assumed to be the same as that characterized in the first constructional example. The image $k$ cannot be perceived by the eye of the observer at the ocular $d$, $e$ and the ray pencil emanating from it is divided by the silvered surfaces, reflecting on both sides, of the separating prism system $c$, $c$ in two partial pencils of the correcting rays which traverse one each of the telescope systems $a$, $b$ in the reversed path of rays in the cross section of the lost rays. The objective systems are formed by two pentagonal optical square-prisms $a$ and $a^1$, of which the former is provided with an image erecting roof, and of two objective lenses $b$. Two prisms $c$ form the separating prism system, two lenses $d$ and $e$ the ocular. The measuring device is intimated by a displaceable, refractive prism $f$. With the aid of two pentagonal optical square-prisms $l$ the correcting mark $k$, in the case of an undisturbed state of correction of the telemeter, is united to an image $m$, consisting of two coinciding partial images $o$ and $p$, which coincides with the correcting mark, whilst in the event of a disturbed state of correction it is imaged in two partial images $o^0$ and $p^0$. Figs. 18 and 19 show the ocular image-field for both cases. The correcting process of this fourth and all the following constructional forms of the new instrument entirely corresponds to that of the first three examples unless deviations therefrom are particularly mentioned.

By using the device shown for a coincidence telemeter one arrives at an arrangement represented as the fifth example in Figs. 20 to 23. As in the telemeter shown both objective prisms $a$ are provided with an image-erecting roof, it is necessary to provide an inversion of the image in the correcting path of rays in order to render visible the partial images $o$ and $p$ and $o^0$ and $p^0$ respectively to the eye of the observer at the ocular $d$, $e$ by which inversion the inversion of the image (missing in the prism $a^1$ of the fourth example) on the second objective prism $a$ is superseded again. The correcting reflector system consists therefore of a pentagonal optical square-prism $l$ and of a second pentagonal optical square-prism $l^1$ which is provided with an image-inverting roof. Figs. 22 and 23 again show the ocular image-field for an undisturbed and a disturbed state of correction of the telemeter.

The sixth example (Figs. 24 to 27) shows for a uniform coincidence telemeter an additional inversion of the image by means of a Dove prism $u$ inserted into the part of the correcting path of rays not required for distance measuring. In this case the correcting reflector system again consists of two uniform pentagonal optical square-prisms $l$.

In the seventh example (Figs. 28 to 31) there is brought about with the aid of a double wedge $v$, the remaining arrangement being the same, instead of the inversion of the image an upward and downward deflection of the partial pencils of the correcting rays by a small angle out of their direction, so that the pencils intersect in the ocular image-field. The correcting mark, lying as a real image $k$ of the mark $s$ in the ocular image-field, remains invisible, whilst it is possible to render visible a part each of the partial images $o$ and $p$ and $o^0$ and $p^0$ respectively because a part each of the partial pencils of the correcting rays now falls upon such a surface of a prism $c$ each in the separating prism system which deflects the rays into the optical axis of the ocular $d$, $e$. In the extreme case the wedge-angle of the double wedge $v$ could be so chosen that the separating prism system just admits of the undiminished passage of both partial pencils.

The arrangement of the seventh example has the drawback that the two visible partial images $o$ and $p$ and $o^0$ and $p^0$ respectively are only perceived by one half each of the exit pupil and, since in its locus lies the eye-pupil of the observer, by various parts of the eye. Owing to the irregularities of the eye reading errors may arise which, however, can be obviated by the use of a double-refractive prism instead of the double wedge $v$, which prism divides an incident luminous ray in two rays having the same, opposite deflections, e. g. a Wollaston chalky spar-prism. On this solution rests the eighth example (Figs. 32 to 35). The Wollaston prism consists of two chalky spar-wedges $w^1$ and $w^2$ which are cut from the crystal in such a way that the axes of the crystal form a right angle and both axial directions are perpendicular to the incoming luminous rays. The axial position is shown in Fig. 33 by lines and dots.

The ninth example (Figs. 36 and 39) again represents a coincidence telemeter. Into the path of the correcting rays not required for distance measuring is inserted a plane-parallel plate $x$ having a surface reflecting on both sides by which plate the direction of the partial pencils of the correcting rays is inverted. In the case of a disturbed state of correction of one of the telescope systems only a partial image of the correction mark, e. g. the partial image $p$ is disposed into the position $p^0$, whilst the position of the partial image $o$ remains the same.

The tenth example (Figs. 41 to 43) relates to an inversion telemeter, corresponding to the fourth example (Figs. 16 to 19). The objective systems are again formed by two pentagonal optical square-prisms $a^1$ and $a^2$, of which the former is provided with an image-erecting roof, and of two objective systems $b^1$ and $b^2$. As a separating prism system is chosen a prism combination consisting of two isosceles-rectangular prisms $c^1$ and $c^2$, two parallelogram-shaped prisms $c^3$ and $c^4$ having a pointed edge-angle of 45°, another isosceles-rectangular prism $c^5$ and a cubiform prism $c^6$ which are cemented together as shown on an enlarged scale in Fig. 43 in a perspective. The separating prism system is fixed within a casing A which is connected to two tubular bodies $B^1$ and $B^2$ and which carries within a tube an adjustable ocular C, whose optical parts consist of a field lens $d$ and an eye lens $e$. At the free ends of the tubes $B^1$ and $B^2$ are fixed two optical square-casings $D^1$ and $D^2$. For the reception of the measuring device a prism casing E is inserted between $B^2$ and $D^2$. The principal parts of the measuring device form two refractive prisms $f^1$ and $f^2$, rotatable in opposite direction at an equal angular speed, which replace in a known way the aforesaid displaceable prism $f$ and which can be rotated from a milled head G by means of a bevel wheel F. The milled head G is connected with a divided drum H which forms together with an index T fixed on the casing E the reading device of the telemeter. On the side, opposite the ocular C, of the casing A there is provided an excavation in which is fixed on a ground glass $y$ a perpendicular line $s$ serving as a mark. This mark $s$ is imaged into the ocular image-plane by a convexo-plane lens $t$ which is cemented to the prism $c^6$ on the separating prism system. Two pentagonal optical square-prisms $l^1$ and $l^2$ form the correcting reflector system and are disposed in a special casing $k$. In order to restore the original state of correction, after its having been disturbed, serves a refractive prism $z$ which is inserted into the path of rays and which can be displaced by a rack and pinion on a carriage guide O by means of a knob N fitted on the outside of the tube $B^1$. The measuring ray pencil emanating from the objective reflector system $a^1$ and the objective $b^1$ is reflected in the prism $c^1$ in the direction of the ocular C and traverses unrefracted the prisms $c^5$ and $c^3$. As shown by hatching in Fig. 43, the upper half of the cemented surface between these prisms is silvered so as to reflect on both sides. A plane perpendicular to the measuring ray pencil through the lower edge of the reflecting surface, the connecting line of two prism edge-points L and M, lies in the ocular image-plane, whereby the edge LM appears as the boundary line of the image-field. Of the measuring ray pencil, emitted by the objective $b^1$, only the partial pencil lying below the boundary line LM is transmitted unhindered to the ocular, whilst the partial pencil lying above this line is downwardly reflected and of no avail for the measurement. The measuring ray pencil emerging from the objective reflector system $a^2$ and the objective $b^2$ is parallelly displaced in the upward direction in the prism $c^4$ by the height of the prism $c^2$ and reflected in the latter in the direction of the ocular, whereby the parallel displacement causes by the prism $c^4$ is superseded in the prism $c^3$ by a like parallel displacement in the downward direction. It is only the partial pencil striking the silvered surface above the boundary line LM which is transmitted to the ocular, whilst the partial pencil striking the prism surface below this line is lost for the imaging. On the path of the lost rays of the imaging pencils emerging from the two objective systems the mark $s$ is really imaged in the ocular-image-field through the lens $t$ by means of the prisms $c^6$ and $c^5$. The image of the mark $s$ intersects the boundary line and serves as a correcting mark. The correcting rays emitted by it traverse in two partial pencils the separating prism system and one each of the objective systems in the reversed path of rays and are transmitted during the correcting process at any one time to the other objective system by the two correcting reflector prisms $l^1$ and $l^2$ in order to be eventually united on the path of the measuring rays in the ocular image-plane to two partial images of the correcting mark.

With a view to correcting the apparatus it is necessary to dispose the casing K parallelly to the telemeter with the reading device set to "infinite" in such a way that one each of the correcting reflector systems $l^1$ and $l^2$ is inserted in front of one of the two objective reflector systems $a^1$ and $a^2$. If the state of correction of the telemeter be disturbed and if therefore the inspection at the ocular shows the image represented in Fig. 19 it is simply required to restore the coincidence of the two partial images of the mark $o^0$ and $p^0$ by rotating the knob N and the thus caused displacement of the prism $z$ on the carriage guide O.

I claim:

1. In a device for measuring distances and adjusting the same two telescopes, each containing an objective and an entrance reflector system deflecting the optical axis by about 90°, a separating prism system common to both telescopes and located behind the objectives, an ocular disposed behind the separating prism system, the separating prism system being adapted to transmit of each of the two ray pencil systems entering the two telescopes a part to the ocular, a deflecting device adapted to displace at least one of the two images, produced by the two objectives, parallelly to the plane containing the axes of the two telescopes, a distance scale and an index coacting with this scale, one of these two parts being operatively connected with the said deflecting device, a mark lying outside the image plane of the said ocular, an optical system disposed behind the said objectives and adapted to image the mark in this image plane, and a correcting reflector system, deflecting the traversing rays by about 180°, the correcting reflector system being adapted to be fixed before the telemeter and the entrance apertures of this system having about the same distance apart as the entrance apertures of the two telescopes.

2. In a device for measuring distances and adjusting the same two telescopes, each containing an objective and an entrance reflector system deflecting the optical axis by about 90°, a separating prism system common to both telescopes and located behind the objectives, an ocular disposed behind the separating prism system, the separating prism system being adapted to transmit of each of the two ray pencil systems entering the two telescopes a part to the ocular, a deflecting device adapted to displace at least one of the two images, produced by the two objectives, parallelly to the plane containing the axes of the two telescopes, a distance scale and an index coacting with this scale, one of these two parts being operatively connected with the said deflecting device, a mark lying outside the image plane of the said ocular, an optical system adapted to image the mark in this image plane on the path on which those rays emerge from the separating prism system, which are not transmitted by this system to the ocular, and a correcting reflector system, deflecting the traversing rays by about 180°, the correcting reflector system being adapted to be fixed before the telemeter and the entrance apertures of this system having about the same distance apart as the entrance apertures of the two telescopes.

3. Telemeter comprising two telescopes, each of which contains an objective and an entrance reflector system deflecting the optical axis by about 90°, a separating prism system adapted to transmit of each of the two ray pencil systems entering the two telescopes a part to the ocular, a deflecting device adapted to displace at least one of the two images, produced by the two objectives, parallelly to the plane containing the axes of the two telescopes, a distance scale and an index coacting with this scale, one of these two parts being operatively connected with the said deflecting device, a mark lying outside the image plane of the said ocular, and an optical system disposed behind the said objectives and adapted to image the mark in this image plane.

4. Telemeter comprising two telescopes, each of which contains an objective and an entrance reflector system deflecting the optical axis by about 90°, a separating prism system adapted to transmit of each of the two ray pencil systems entering the two telescopes a part to the ocular, a deflecting device adapted to displace at least one of the two images, produced by the two objectives, parallelly to the plane containing the axes of the two telescopes, a distance scale and an index coacting with this scale, one of these two parts being operatively connected with the said deflecting device, a mark lying outside the image plane of the said ocular, and an optical system adapted to image the mark in this image plane on the path on which those rays emerge from the separating prism system, which are not transmitted by this system to the ocular.

OTTO EPPENSTEIN.